United States Patent [19]
Matsuura

[11] Patent Number: 5,735,241
[45] Date of Patent: Apr. 7, 1998

[54] START UP CONTROL SYSTEM FOR DIRECT FUEL INJECTION ENGINE AND THE METHOD THEREOF

[75] Inventor: Takashi Matsuura, Tokyo, Japan

[73] Assignee: Fuji Jukogyo Kabushiki Kaisha, Tokyo, Japan

[21] Appl. No.: 791,961

[22] Filed: Jan. 31, 1997

[30] Foreign Application Priority Data

Feb. 29, 1996 [JP] Japan ................... 8-043759

[51] Int. Cl.$^6$ ............................... F02D 45/00
[52] U.S. Cl. ............... 123/305; 123/419; 123/424; 123/491
[58] Field of Search ............... 123/305, 414, 123/417, 419, 422, 424, 491, 179.5, 179.6, 179.17

[56] References Cited

U.S. PATENT DOCUMENTS

| | | |
|---|---|---|
| 4,459,961 | 7/1984 | Nishimura et al. ............... 123/491 |
| 4,982,712 | 1/1991 | Abe ................................. 123/424 |

Primary Examiner—Willis R. Wolfe
Assistant Examiner—Hieu T. Vo
Attorney, Agent, or Firm—Beveridge, DeGrandi, Weilacher & Young, LLP

[57] ABSTRACT

A start up control system of an in-cylinder direct fuel injection engine includes, cylinder identifying means for identifying a particular cylinder based on crank pulses and cam pulses, engine speed calculating means for calculating engine speed, second engine speed calculating means for calculating a start up engine speed of a particular cylinder during its combustion stroke, and start up judging means for judging whether the particular cylinder is in a starting up condition or has completed firing. The system further includes start up selecting means for selecting a start up control including fixing the fuel injection starting timing at a predetermined crank angle and at the same time establishing ignition timing so as to ignite when a specified time has elapsed after the fuel injection finishing time when it is judged that the particular cylinder is in a starting up condition and for selecting a normal operation control including establishing both fuel injection starting timing and ignition timing according to engine operating conditions when it is judged that the particular cylinder has completed firing.

19 Claims, 6 Drawing Sheets

START UP CONTROL SYSTEM FOR DIRECT FUEL INJECTION ENGINE AND THE METHOD THEREOF

BACKGROUND OF THE INVENTION

1. Field of the Invention

The present invention relates to a start up control system and method for an in-cylinder direct fuel injection engine and more particularly to an engine control system and method for controlling a transfer process from a starting up event to normal operation by judging the state of firing for individual cylinders of the engine.

2. Prior Arts

In a port fuel injection engine wherein fuel is injected into the intake manifold or intake port, the amount of fuel to be injected during starting up is compensated for the delay of supplied fuel by fuel stuck to the inner wall of the intake manifold or intake port.

On the other hand, in an in-cylinder direct fuel injection engine wherein fuel is injected directly into the combustion chamber, it is possible to control the injection amount and injection timing of fuel to be injected to individual cylinders with high precision because of the absence of such delay of supplied fuel as in the port fuel injection engine. This control is carried out also in the starting up process of the engine. One of the features of the direct fuel injection engine is an excellent startability when compared with the port injection engine.

In this case, it is vitally important to judge accurately the time when a starting up stage of the engine has been finished, namely, when all cylinders have transferred to a complete firing state, because based on this judgment the control strategy must be changed from the start up control to the normal operation control. In the direct fuel injection engine as well as in the port injection engine, that judgment is generally based on engine speed and an ON-OFF operation of the starter switch. Once the judgment has been made, control strategies of the fuel injection and ignition timing are switched from the start up control to the normal operation control for all cylinders at the same time.

As a result of this, therefore, even if a certain cylinder remains in an incomplete firing state, once it is judged that the start up-stage has been finished, all cylinders are forcedly changed over to the normal operation control. This leads to not only an elongated start up period but also increasing misfires and emissions of unburned gas in the cylinder in the incomplete firing state. Inversely, in a case where a certain cylinder has reached the complete firing state, while the engine remains in the start up control, that cylinder is subjected to the start up control, this also leading to an incomplete combustion therein and an elongated start up period.

Thus, in case of the in-cylinder direct fuel injection engine, since all of the supplied fuel is injected into the cylinders, it has a capability of making a fine control for each cylinder by discriminating between the starting up control and the normal operation control but that capability can not be fully exhibited with the prior art wherein the switching from the start up control to the normal operation control is performed for all cylinders at the same time.

Accordingly, it is an object of the present invention to provide a start up control system capable of injecting a proper amount of fuel to individual cylinders and igniting it at a proper timing so as to shorten the start up period, furthermore and improve emissions and fuel economy performances in an in-cylinder direct fuel injection engine.

SUMMARY OF THE INVENTION

To achieve the aforementioned object, the start up control system according to the present invention comprises: cylinder identifying means for identifying a particular cylinder based on a crank pulse and a cam pulse, engine speed calculating means for calculating an engine speed based on the crank pulse, second engine speed calculating means for calculating a start up engine speed of the particular cylinder during combustion stroke from time intervals of the crank pulses; start up judging means for judging whether the particular cylinder is in a starting up condition or has completed firing by comparing the start up engine speed with a specified firing completion engine speed; and start up selecting means for, selecting a start up control with respect to the particular cylinder when it is judged that the particular cylinder is in a starting up condition and for selecting a normal operation control with respect to the particular cylinder when it is judged that the particular cylinder has completed firing, the start up control including fixing a fuel injection starting timing at a predetermined crank angle and at the same time establishing an ignition timing so as to ignite when a specified time has elapsed since a fuel injection finishing timing and the normal operation control including establishing both the fuel injection starting timing and the ignition timing according to engine operating conditions.

BRIEF DESCRIPTION OF THE DRAWINGS

The present invention will be best understood by reference to the following description taken in conjunction with the accompanying drawings, in which.

DETAILED DESCRIPTION OF PREFERRED EMBODIMENTS

Figure 5:
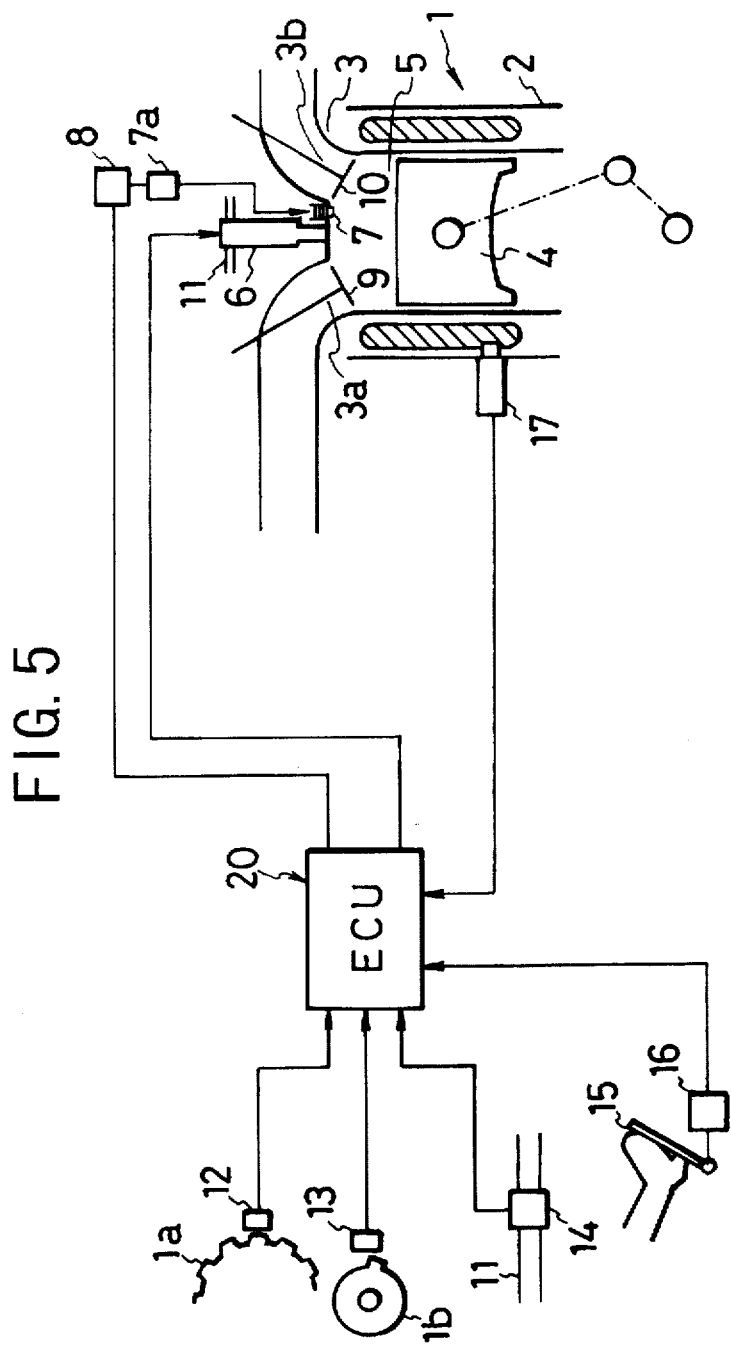
FIG. 5 is a schematic drawing showing an example of an in-cylinder direct fuel injection engine according to the present invention.

Referring now to FIG. 5, numeral 1 denotes an incylinder direct fuel injection multicylinder engine (hereinafter referred to as an in-cylinder direct fuel injection engine). In this embodiment, a four cycle four cylinder engine is shown. Numeral 5 denotes a combustion chamber formed by a cylinder block 2, a cylinder head 3 and a piston 4. In the combustion chamber 5 for each cylinder, there are provided a fuel injector 6 and a spark plug 7. The spark plug 7 is connected with a secondary side of an ignition coil 7a. A primary side of the ignition coil 7a is connected with an igniter 8.

In the cylinder head 3, an intake port 3a and an exhaust port 3b are formed and an intake valve 9 and an exhaust valve 10 are disposed in both ports 3a, 3b respectively.

Further, high pressure fuel is supplied by a fuel pump (not shown) to the fuel injector 6 through a high pressure fuel line 11 after being regulated by a pressure regulator (not shown). Thus, fuel is metered by the fuel injector 6 and injected therefrom into the combustion chamber 5.

A crank angle sensor 12 is disposed adjacent to the outer periphery of a crank rotor 1a coaxially coupled with a crank shaft (not shown). On the outer periphery of the crank rotor 1a, there are provided with 12 projections equally spaced (30 degrees CA). The crank angle sensor 12 is positioned so as to meet with one projection corresponding to a crank angle 15 degrees BTDC (before top dead center) of #1 cylinder during the compression stroke.

Further, a cam angle sensor 13 is disposed adjacent to a cam rotor 1b which is rotated at a half rotation number of the crank rotor 1a. On the outer periphery of the cam rotor 1b, there is provided a projection. The cam angle sensor 13 is positioned so as to meet with that projection corresponding to a crank angle between 15 degrees BTDC and 45 degrees BTDC of #1 cylinder during the compression stroke.

Figure 6:
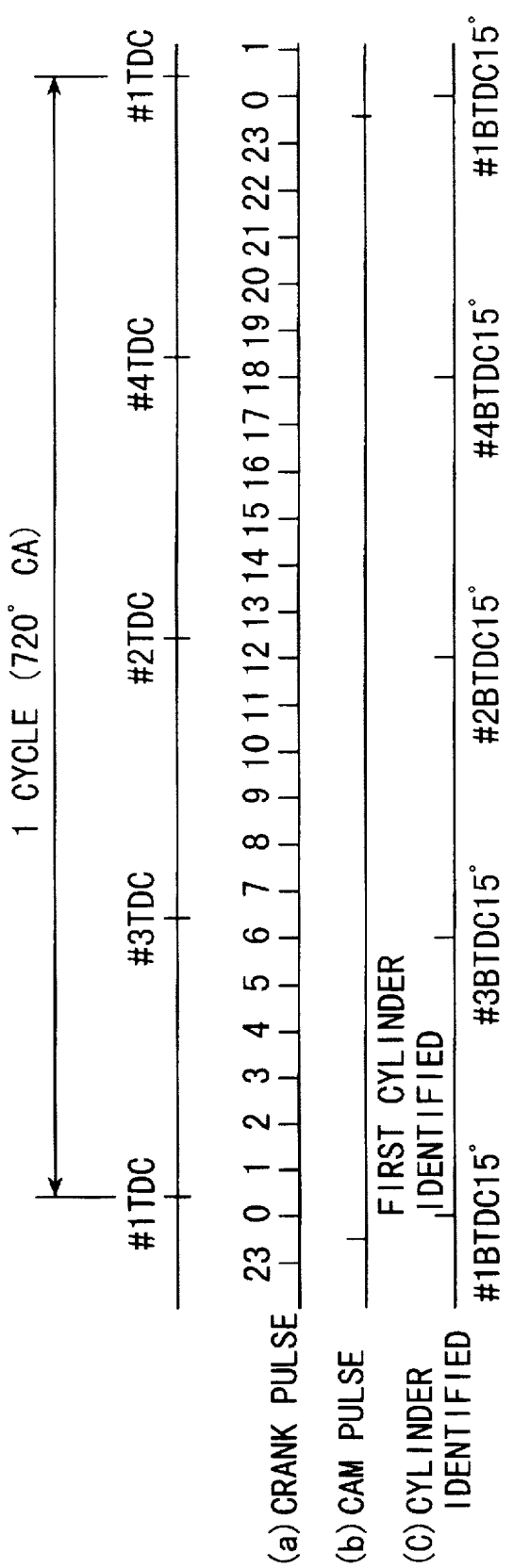
FIG. 6 is a time chart showing a cylinder identification.

Accordingly, as shown in FIG. 6, it is judged that a first crank pulse outputted from the crank angle sensor 12 after a cam pulse is outputted indicating a crank angle of 15 degrees BTDC for #1 cylinder. Hereinafter, the cylinder number is identified by counting the consecutive crank pulses outputted from the crank angle sensor 12. The firing order of this engine is #1, #3, #2 and #4.

In the high pressure fuel line 11, a fuel pressure sensor 14 is disposed to detect the fuel pressure FUP. Further, an accelerator opening angle sensor 16 is disposed at an accelerator pedal 15 to detect an accelerator depression amount α. Further, a coolant temperature sensor 17 is disposed in the coolant passage formed in the cylinder block 2 to detect a coolant temperature TW corresponding to a typical engine temperature. Further, although miscellaneous sensors and switches are provided in the engine 1 to detect engine operating conditions, such descriptions will be omitted hereinafter because there is no necessity to further explain in the following descriptions.

Output signals from the aforementioned sensors 12, 13, 14, 16 and 17 are inputted to an electronic control unit (ECU) 20 wherein a fuel injection starting timing, a fuel injection amount, an ignition timing and the like are calculated for each cylinder based on the output signals from the above sensors and a drive signal corresponding to the fuel injection amount is outputted to an actuator of the fuel injector 6 at a timing corresponding to the fuel injection starting timing. Additionally, an ignition signal corresponding to the ignition timing is also outputted to the igniter 8.

Figure 1:
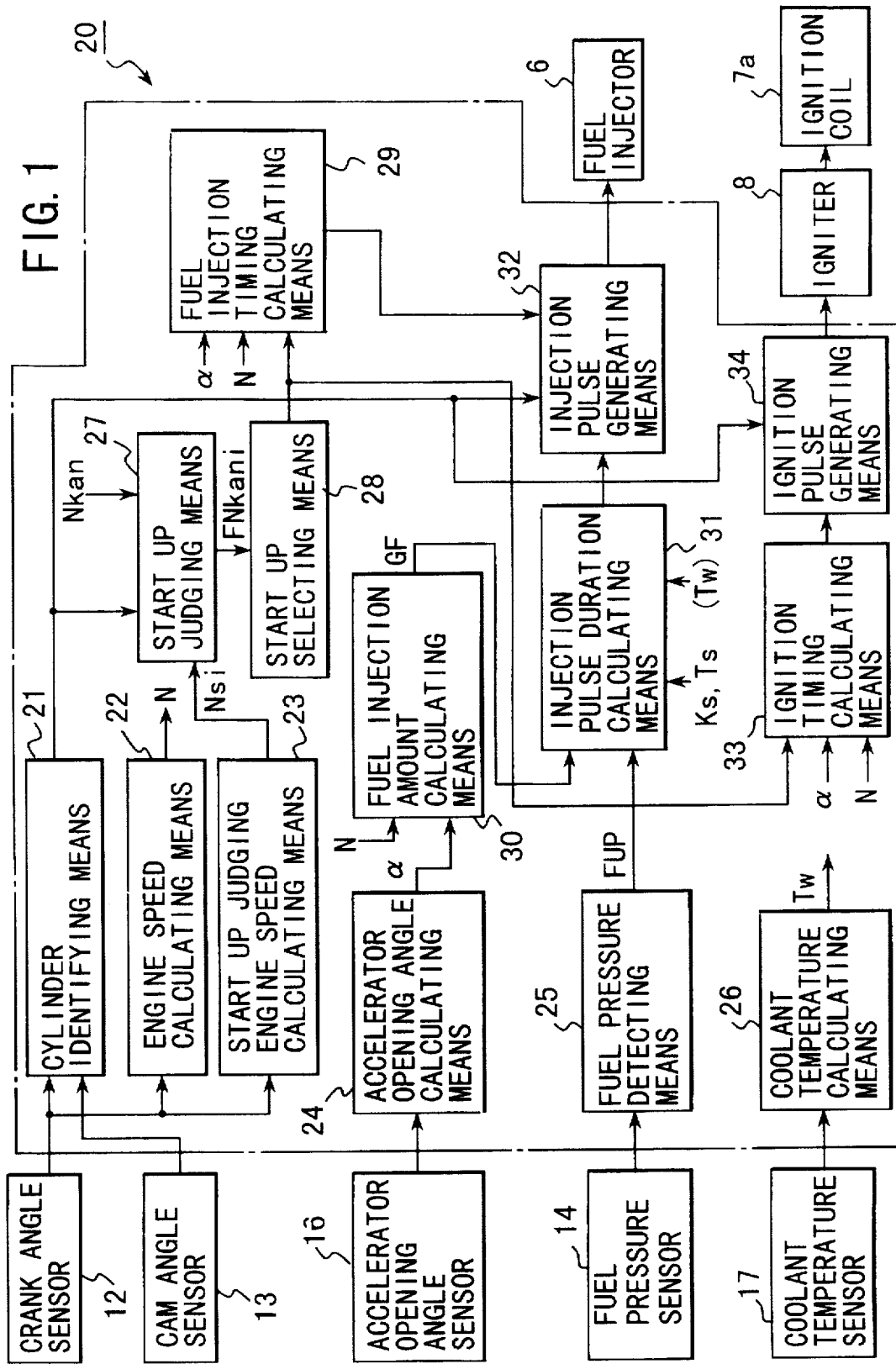
FIG. 1 is a block diagram of a start up control system according to the present invention.

As shown in FIG. 1, the electronic control unit 20 is constituted by cylinder identifying means 21, engine speed calculating means 22, start up judging engine speed calculating means 23, accelerator opening angle calculating means 24, fuel pressure detecting means 25, coolant temperature calculating means 26, start up judging means 27, start up selecting means 28, fuel injection timing calculating means 29, fuel injection amount calculating means 30, injection pulse duration calculating means 31, injection pulse generating means 32, ignition timing calculating means 33 and ignition pulse generating means 34.

In the cylinder identifying means 21, first responsive to a cam pulse outputted from the cam angle sensor 13, a cylinder during compression stroke is identified and the subsequent cylinders then are identified by counting crank pulses outputted from the crank angle sensor 12. That is, as shown in FIG. 6, when a cam pulse is inputted, a first crank pulse after that cam pulse indicates a crank angle of 15 degrees BTDC for #1 cylinder. Similarly, it is judged that the 6th crank pulse shows 15 degrees BTDC of crank angle for #3 cylinder, the 12th crank pulse does 15 degrees BTDC of crank angle for #2 cylinder and the 18th crank pulse does 15 degrees BTDC of crank angle for #4 cylinder. Further, when a cam pulse is inputted again, counting of the following crank pulses is cleared by triggering the first crank pulse input after that cam pulse.

The engine speed calculating means 22 is for calculating an engine speed N by measuring a time interval of the crank pulse. Further, the accelerator opening angle calculating means 24 is for calculating a depression amount α of the accelerator pedal 15 by applying an A/D conversion to an output voltage of the accelerator opening angle sensor 16. The fuel pressure detecting means 25 calculates a fuel pressure FUP in the high pressure fuel line 11 by applying an A/D conversion to an output voltage of the fuel pressure sensor 14 provided in the high pressure fuel line 11.

In the start up judging engine speed calculating means 23, an engine speed $N_{si}$ during the combustion stroke for judging whether a given cylinder #i has been started up or not is calculated for an individual cylinder. That is to say, according to the exampled time chart in FIG. 6, the 1st to 6th crank pulses are for #1 cylinder during combustion stroke, the 7th to 12th crank pulses are for #3 cylinder during combustion stroke, the 13th to 18th crank pulses are for #2 cylinder during combustion stroke, and the 19th to 0th crank pulses are for #4 cylinder during combustion stroke. The engine speed $N_{si}$ for judging starting up is obtained by averaging time intervals of predetermined consecutive crank pulses therein. Thus, it can be judged accurately that the ith cylinder has completed firing by comparing that engine speed $N_{si}$ with a reference value.

That is to say, in the start up judging means 27, if the engine speed $N_{si}$ is smaller than a predetermined firing completion engine speed $N_{kan}$, it is judged that the subject cylinder is in the start up stage, i.e., it has not yet completed firing and then a firing completion flag $FN_{kani}$ for the ith cylinder is held in an initial value ($FN_{kani}=0$). And, if the engine speed $N_{si}$ is equal to or larger than $N_{kan}$, it is judged that that ith cylinder has completed firing and then the firing completion flag $FN_{kani}$ is set ($FN_{kani}=1$).

In the start up selecting means 28, values of the firing completion flags $FN_{kan1}$ through $FN_{kan4}$ corresponding to each cylinder #1 through #4 are checked. With respect to a cylinder whose firing completion flag $FN_{kani}$ is equal to 0, namely, a cylinder in the start up stage, a starting up control is selected and with respect to a cylinder whose firing completion flag $FN_{kani}$ is equal to 1, namely, a cylinder completing firing, a normal operation control is selected.

In the fuel injection timing calculating means 29, with respect to #i cylinder where the starting up control has been selected, the fuel injection starting timing is established at a predetermined fixed crank angle. This fixed crank angle is determined dependently on combustion such as strategies, stratified charge combustion or homogeneous charge combustion. For example, in a case where the combustion strategy is a stratified charge combustion, the fixed crank angle is established at a comparatively late crank angle near the end of the compression stroke and, in a case where the combustion strategy is a homogeneous charge combustion, it is established at a comparatively early crank angle between the suction stroke and the compression stroke so as to allow enough time for premixing. The fixed crank angle may be synchronized with a crank pulse outputted every 15 degrees of crank angle.

On the other hand, in the fuel injection timing calculating means 29, with respect to #i cylinder where the normal operation control has been selected in the start up selecting means 28, the fuel injection starting timing (crank angle) is established by referring to a map parameterizing the engine speed N and the accelerator opening angle α.

In the fuel injection amount calculating means 30, fuel injection amount GF per one cycle is established by referring to a fuel injection amount determining map parameterizing the engine speed N and the accelerator opening angle α. Further, with respect to #i cylinder where the start up control is selected, the fuel injection amount GF may be established otherwise by referring to a map parameterizing the coolant temperature $T_w$, for example.

In the injection pulse duration calculating means 31, a fuel injection pulse duration $T_{out}$ which means a valve opening time of the fuel injector 6 for the subject #i cylinder is calculated according to the formula:

$$T_{out}=K_s \times GF+T_s$$

where $K_s$ is a fuel pressure coefficient calculated based on the fuel pressure FUP detected in the fuel pressure detecting means 25; $T_s$ is a dead time derived from the fuel pressure FUP; and GF is a fuel injection amount calculated in the fuel injection amount calculating means 30 and corrected by the fuel pressure coefficient $K_s$ and the dead time $T_s$.

In the injection pulse generating means 32, when the crank angle reaches the fuel injection timing calculated in the fuel injection timing calculating means 29, a drive signal corresponding to the fuel injection pulse duration $T_{out}$ calculated in the injection pulse duration calculating means 31 is outputted to the fuel injector 6 for the subject ith cylinder so as to inject the metered fuel therefrom.

On the other hand, in the ignition timing calculating means 33, with respect to the ith cylinder where the start up control has been selected in the start up selecting means 28, an ignition timing $T_{spk}$ (crank angle) is calculated according to the formula $T_{spk}=T_{out}+T_{adv}$, where $T_{adv}$ is a time for ignition after the fuel injection finishing timing and is established as a constant time in this embodiment. Further, with respect to the ith cylinder where the normal operation control is selected in the start up selecting means 28, the ignition timing $T_{spk}$ (crank angle) is established by looking up a predetermined normal operation map parameterizing the engine speed N and the accelerator opening angle α.

Since the time from the end of the fuel injection until spark ignition is set to be constant, in a case where the combustion at starting up begins with stratified charge combustion, it becomes possible to ignite rich air/fuel mixture formed just around the spark plug 7 and raise the startability of the engine.

Further, in the ignition pulse generating means 34, the ignition timing $T_{spk}$ calculated in the ignition timing calculating means 33 is set to the ignition timer of the #i cylinder identified. When the ignition timer driven by the reference crank angle reaches the ignition timing $T_{spk}$, an ignition pulse (dwell cut signal) is outputted to the primary side of the ignition coil 7a to spark the spark plug 7 of the #i cylinder.

Next, the fuel injection and ignition timing controls carried out in the electronic control apparatus 20 will be described referring to flowcharts shown in FIGS. 2, 3 and 4.

Figure 2:
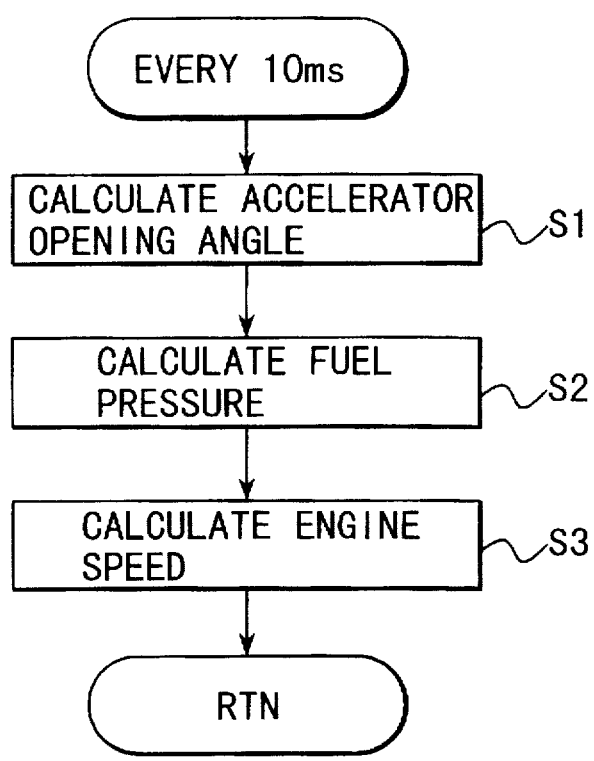
FIG. 2 is a flowchart of a processing routine of input signals.

The flowchart in FIG. 2 indicates a signal processing routine which is carried out every 10 milliseconds to calculate the accelerator opening angle α, the fuel pressure FUP and the engine speed N. At a step S1, the accelerator opening angle α is calculated by applying an A/D conversion to an output voltage of the accelerator opening angle sensor 16 and at S2 the fuel pressure FUP is calculated by applying an A/D conversion to an output voltage of the fuel pressure sensor 14. Further, at S3 the engine speed N is calculated based on the interval of crank pulses outputted from the crank angle sensor 12 and then the control flow leaves the routine.

Figure 3:
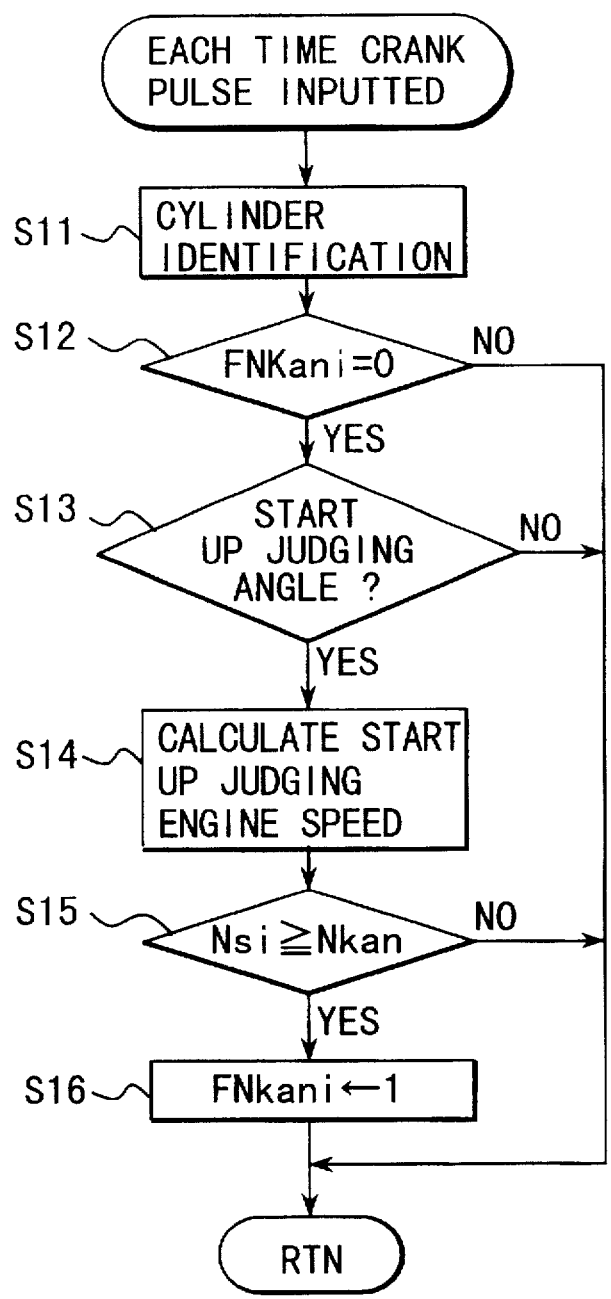
FIG. 3 is a flowchart of a routine for judging a starting up state.

The flowchart in FIG. 3 indicates a start up judging routine which is carried out each time a crank pulse is input. At S11, a certain cylinder #i during the combustion stroke is identified based on an interruption timing of the cam pulse input immediately before that crank pulse and then at S12 a firing completion flag $FN_{kani}$ for the #i cylinder is checked. The firing completion flag $FN_{kani}$ has been set to 0 as an initial value when electric power is supplied to the electronic control unit 20.

If it is judged that $FN_{kani}=0$, namely, the cylinder is before start up or during start up, the program goes to steps after S13 where the start up judgment is made and if $FN_{kani}=1$, namely, the cylinder has completed firing, the control flow leaves the routine.

More particularly, if it is judged that $FN_{kani}=0$, namely, the cylinder is before start up or during start up, the program steps to S13 where it is judged whether or not the presently input crank pulse is a crank angle at which the start up judgment is to be executed. In this embodiment, the start up judging engine speed $N_{si}$ is calculated based on a time interval between specified crank angles. Specifically, as shown in FIG. 6, on the basis of the interruption of cam pulse, those specified crank angles are the crank pulses from 1st to 6th for the #1 cylinder, from 7th to 12th for the #3 cylinder, from 13th to 18th for the #2 cylinder and from 19th to 0th for the #4 cylinder. The start up judging engine speed $N_{si}$ is calculated based on the time interval across predetermined consecutive several crank angles during the combustion stroke or between two crank angles during the combustion stroke. And, among those crank angles, the last crank angle is the crank angle at which the start up judgment is to be executed. Therefore, if the present crank pulse is one showing the crank angle other than this, the program goes out of the routine directly. On the other hand, if the present crank pulse is one corresponding to the crank angle at which the start up judgment is to be executed, the program goes to S14 where the start up judging engine speed $N_{si}$ is calculated from the time interval of the specified crank angles during the combustion stroke.

Further, at S15 the start up judging engine speed $N_{si}$ is compared with the predetermined firing completion engine speed $N_{kan}$ to judge if the subject #i cylinder is in the start up process or has completed firing. That is, if it is judged that $N_{si}$ is smaller than $N_{kan}$, this indicates that the cylinder is in the start up process and consequently the program goes out of the routine. If it is judged that $N_{si}$ is equal to or larger than $N_{kan}$, this indicates that the cylinder has completed firing and the program goes to S16 wherein the firing completion flag $FN_{kani}$ of the subject #i cylinder is set ($FN_{kani}=1$).

Figure 4:
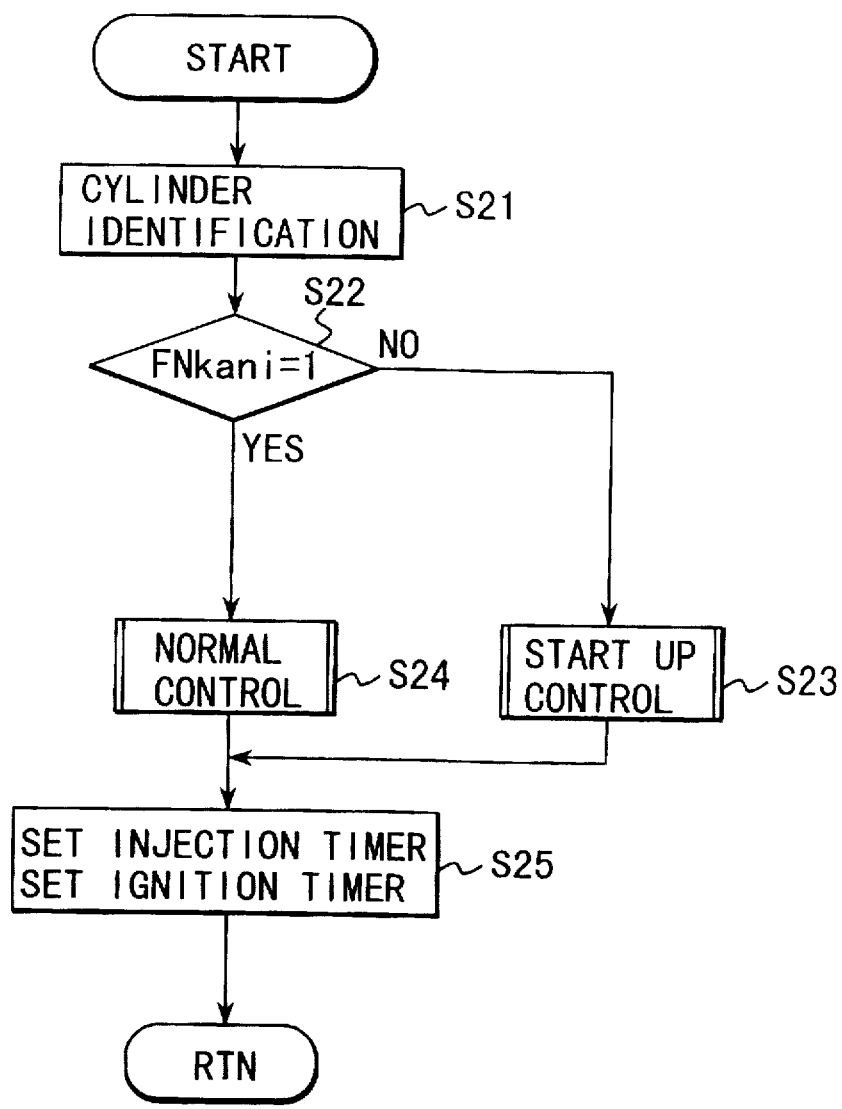
FIG. 4 is a flowchart of a routine for determining a fuel injection control and an ignition control.

Referring now to FIG. 4, this flowchart indicates a fuel injection and ignition timing control routine which is executed every specified time or every specified crank angle. First, at S21 the #i cylinder which is subjected to the fuel injection and ignition timing control is identified based on an input signal of the crank pulse and an interruption signal of the cam pulse and at S22 it is judged by referring to the firing completion flag $FN_{kani}$ (i denotes ith cylinder) whether the subject cylinder is in the start up process or has completed firing.

Further, if it is judged that $FN_{kani}=0$, i.e., the subject cylinder #i is in the start up process, the program goes to S23 at which the start up control is carried out so as to establish the start up injection pulse duration Tout and the start up ignition timing $T_{spk}$ and then the program steps to S25. Further, if it is that $FN_{kani}=1$, i.e., the subject #i cylinder has completed firing, the program goes to S24 where the normal operation control is carried out so as to establish the normal operation injection pulse duration $T_{out}$ and the normal operation ignition timing $T_{spk}$ and then the program goes to S25.

And, when the fuel injection starting timing comes, a drive signal of the fuel injection pulse duration $T_{out}$ is outputted to the fuel injector 6 of the subject #i cylinder. Further, when the ignition timing comes, an ignition signal (dwell cut signal) is outputted to the primary side of the ignition coil 7a of the subject #i cylinder.

In summary, the start up control system according to the present invention has the capability of controlling the fuel injection amount, fuel injection timing and ignition timing of individual cylinders, also has the capability of detecting the firing state of a particular cylinder. It therefore is possible to apply the start up control to cylinders not yet having completed firing and to introduce the normal operation control to cylinders having completed firing, whereby the startability of the engine can be substantially improved, this leading to shortening the start up time and providing better fuel economy.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A start up control system for a cylinder direct fuel injection engine having a plurality of cylinders with a fuel injector provided in each of said cylinders, comprising:

cylinder identifying means for identifying a particular cylinder performing a combustion stroke;

start up judging engine speed calculating means for calculating a start up speed of said particular cylinder during the combustion stroke;

start up judging means for judging whether said particular cylinder is in a starting up condition or has completed firing by comparing said start up speed for said particular cylinder with a specified firing completion speed;

start up selecting a means for selecting a start up control process for said particular cylinder when said start up judging means judges that said particular cylinder is in the starting up condition and for selecting a normal operation control process for said particular cylinder when said start up judging means judges that said particular cylinder has completed firing.

2. A start up control system of an in cylinder direct fuel injection engine as recited in claim 1, wherein said start up control process includes establishing an ignition time such that fuel in said particular cylinder ignites when a specified time has elapsed since a fuel injection finishing time, and said normal operation control process includes establishing said ignition time according to engine operating conditions.

3. A start up control system for cylinder direct fuel injection engine as recited in claim 2, wherein said engine includes an accelerator and an accelerator opening angle calculating means for calculating an accelerator opening angle, and said engine operating conditions include at least said accelerator opening angle and said engine speed.

4. A start up control system for a cylinder direct fuel injection engine as recited in claim 2, wherein:

said start up control process further includes fixing a fuel injection starting time at a predetermined crank angle of the engine, and said normal operation control process further includes establishing said fuel injection starting time according to engine operating conditions.

5. A start up control system for a cylinder direct fuel injection engine as recited in claim 4, wherein said engine includes an accelerator and an accelerator opening angle calculating means for calculating an accelerator opening angle, and said engine operating conditions include at least said accelerator opening angle and said engine speed.

6. A start up control system for a cylinder direct fuel injection engine as recited in claim 1, wherein:

said start up control process includes fixing a fuel injection starting time at a predetermined crank angle of the engine, and said normal operation control process includes establishing said fuel injection starting time according no engine operating conditions.

7. A start up control system for a cylinder direct fuel injection engine as recited in claim 6, wherein said engine includes an accelerator and an accelerator opening angle calculating means for calculating an accelerator opening angle, and said engine operating conditions include at least said accelerator opening angle and said engine speed.

8. A start up control system for a cylinder direct fuel injection engine as recited in claim 1, wherein the start up control system further includes a crank angle sensor for generating crank pulses corresponding to a crank angle of the engine and a cam sensor for generating cam pulses corresponding to a cam angle of the engine;

said cylinder identifying means identifies a particular cylinder performing a combustion stroke based upon a cam pulse and a crank pulse; and said start up speed calculating means calculates the start up speed of said particular cylinder during the combustion stroke from time intervals between crank pulses.

9. A start up control method of a cylinder direct fuel injection engine having a plurality of cylinders with a fuel injector provided in each of said cylinders, comprising:

identifying a particular cylinder performing a combustion stroke;

calculating a start up speed of said particular cylinder during the combustion stroke;

judging whether said particular cylinder is in a starting up condition or has completed firing by comparing said start up speed with a specified firing completion engine speed;

selecting a start up control process for said particular cylinder when it is judged that said particular cylinder is in a starting up condition and selecting a normal operation control process for said particular cylinder when it is judged that said particular cylinder has completed firing.

10. A start up control method of a cylinder direct fuel injection engine as recited in claim 7, wherein said start up control process includes establishing an ignition time such that fuel in said particular cylinder ignites when a specified time has elapsed since a fuel injection finishing time, and said normal operation control process includes establishing said ignition time according to engine operating conditions.

11. A start up control method for a cylinder direct fuel injection engine as recited in claim 10, wherein:

said start up control process further includes fixing a fuel injection starting time at a predetermined crank angle of the engine, and said normal operation control process further includes establishing said fuel injection starting time according to engine operating conditions.

12. A start up control system for a cylinder direct fuel injection engine as recited in claim 11, wherein said engine includes an accelerator and an accelerator opening angle calculating means for calculating an accelerator opening angle, and said engine operating conditions include at least said accelerator opening angle and said engine speed.

13. A start up control method for a cylinder direct fuel injection engine as recited in claim 10, wherein said engine includes an accelerator and an accelerator opening angle calculating means for calculating an accelerator opening angle, and said engine operating conditions include at least said accelerator opening angle and said engine speed.

14. A start up control method for a cylinder direct fuel injection engine as recited in claim 9, wherein:

said start up control process includes fixing a fuel injection starting time at a predetermined crank angle of the engine, and said normal operation control process includes establishing said fuel injection starting time according to engine operating conditions.

15. A start up control method for a cylinder direct fuel injection engine as recited in claim 9, wherein the engine further includes a crank angle sensor for generating crank pulses corresponding to a crank angle of the engine and a cam sensor for generating cam pulses corresponding to a cam angle of the engine;

said particular cylinder performing a combustion stroke is identified based upon a cam pulse and a crank pulse; and said start up speed of said particular cylinder during the combustion stroke is calculated from time intervals between crank pulses.

16. A start up control method for a cylinder direct fuel injection engine as recited in claim 14, wherein said engine includes an accelerator and an accelerator opening angle calculating means for calculating an accelerator opening angle, and said engine operating conditions include at least said accelerator opening angle and said engine speed.

17. A start up control system of a cylinder direct fuel injection engine having a plurality of cylinders with a fuel injector provided in such of said cylinders, a crank angle sensor for detecting a plurality of protrusions formed on an outer periphery of a crank rotor and for generating a crank angle signal in response to detection of a protrusion on the crank rotor, a cam sensor for detecting a protrusion formed on a cam rotor and for generating a cam angle signal in response to detecting the protrusion on the cam rotor, an accelerator sensor for detecting a stepping amount of an accelerator pedal and for generating an accelerator signal indicative of the stepping amount, and a fuel pressure sensor interposed in a high pressure fuel line for detecting a fuel pressure and for producing a fuel pressure signal indicative of the fuel pressure, comprising:

a cylinder number discriminating means responsive to said crank and cam angle signals for discriminating a cylinder number of a cylinder performing a combustion stroke;

engine speed calculating means responsive to said crank angle signal for calculating an engine speed and for generating an engine speed signal;

start up judging engine speed calculating means responsive to said crank angle signal for calculating a starting engine speed of the discriminated cylinder;

starting condition control means responsive to said crank angle signals and said starting engine speed of the discriminated cylinder for deciding a starting condition of the discriminated cylinder by comparing said starting engine speed for the discriminated cylinder with a predetermined value, and for generating a starting control signal when said starting engine speed is lower than said predetermined value and a normal control signal when said starting engine speed is higher than said predetermined value;

fuel injection timing calculating means responsive to said engine speed signal, said accelerator signal and said starting control signal for calculating a fuel injection timing of said discriminated cylinder when said engine is in a starting condition and for outputting a fuel injection timing signal;

fuel injection amount calculating means responsive to said accelerator signal and said engine speed for computing a fuel amount per one cycle of the discriminated cylinder by referring to a map and for generating a fuel injection amount signal;

fuel injection pulse timing calculating means responsive to said pressure and injection amount signals for correcting said fuel amount with timing and pressure delay coefficients to produce a fuel injection pulse timing signal; and injection pulse generating means responsive to said cylinder number signal, said fuel injection timing signal and said injection pulse timing signal for generating an optimum fuel injection pulse signal to drive said fuel injector of said discriminated cylinder.

18. A start up control system of a cylinder direct fuel injection engine having a plurality of cylinders with a fuel injector provided in each of said cylinders, a crank angle sensor for detecting a plurality of protrusions formed on an outer periphery of a crank rotor and for generating a crank angle signal in response to detection of one of said protrusions on said crank rotor, a cam sensor for detecting a protrusion formed on a cam rotor and for generating a cam angle signal in response to detection of said protrusion on said cam rotor, an accelerator sensor for detecting a stepping amount of an accelerator pedal and for generating an accelerator signal indicative of said stepping amount, and a fuel pressure sensor interposed in a high pressure fuel line for detecting a fuel pressure and for producing a fuel pressure signal indicative of the fuel pressure, comprising:

a cylinder number discriminating means responsive to said crank and cam angle signals for discriminating a cylinder number of a cylinder performing a combustion stroke;

engine speed calculating means responsive to said crank angle signal for calculating an engine speed and for generating an engine speed signal;

start up judging engine speed calculating means responsive to said crank angle signal for calculating a starting engine speed of the discriminated cylinder;

starting condition control means responsive to said crank angle signals and said starting engine speed of the discriminated cylinder for deciding a starting condition of the discriminated cylinder by comparing said starting engine speed for the discriminated cylinder with a predetermined value, and for generating a starting control signal when said starting engine speed is lower than said predetermined value and a normal control signal when said starting engine speed is higher than said predetermined value;

ignition timing calculating means responsive to said engine speed signal, said accelerator signal and said starting control signal for calculating an ignition timing of said discriminated cylinder when said engine is in a starting condition and for outputting an ignition timing signal; and ignition pulse generating means responsive to said cylinder number signal and said ignition timing signal for generating an optimum fuel injection pulse signal to drive said fuel injector of said discriminated cylinder.

19. A start up control system of a cylinder direct fuel injection engine having a plurality of cylinders with a fuel injector provided in each of said cylinders, a crank angle sensor for detecting a plurality of protrusions formed on an outer periphery of a crank rotor and for generating a crank angle signal in response to detection of one of said protrusions on said crank rotor, a cam sensor for detecting a protrusion formed on a cam rotor and for generating a cam angle signal in response to detection of said protrusion on said cam rotor, an accelerator sensor for detecting a stepping amount of an accelerator pedal and for generating an accelerator signal indicative of said stepping amount, and a fuel pressure sensor interposed in a high pressure fuel line for detecting a fuel pressure and for producing a fuel pressure signal indicative of the fuel pressure, comprising:

a cylinder number discriminating means responsive to said crank and cam angle signals for discriminating a cylinder number of a cylinder performing a combustion stroke;

engine speed calculating means responsive to said crank angle signal for calculating an engine speed and for generating an engine speed signal;

start up judging engine speed calculating means responsive to said crank angle signal for calculating a starting engine speed of the discriminated cylinder;

starting condition control means responsive to said crank angle signals and said starting engine speed of the discriminated cylinder for deciding a starting condition of the discriminated cylinder by comparing said starting engine speed for the discriminated cylinder with a predetermined value, and for generating a starting control signal when said starting engine speed is lower than said predetermined value and a normal control signal when said starting engine speed is higher than said predetermined value;

fuel injection timing calculating means responsive to said engine speed signal, said accelerator signal and said starting control signal for calculating a fuel injection timing of said discriminated cylinder when said engine is in a starting condition and for outputting a fuel injection timing signal;

fuel injection amount calculating means responsive to said accelerator signal and said engine speed for computing a fuel amount per one cycle of the discriminated cylinder by referring to a map and for generating a fuel injection amount signal;

fuel injection pulse timing calculating means responsive to said pressure and injection amount signals for correcting said fuel amount with timing and pressure delay coefficients to produce a fuel injection pulse timing signal; and injection pulse generating means responsive to said cylinder number signal, said fuel injection timing signal and said injection pulse timing signal for generating an optimum fuel injection pulse signal to drive said fuel injector of said discriminated cylinder;

ignition timing calculating means responsive to said engine speed signal, said accelerator signal and said starting control signal for calculating an ignition timing of said discriminated cylinder when said engine is in a starting condition and for outputting an ignition timing signal; and ignition pulse generating means responsive to said cylinder number signal and said ignition timing signal for generating an optimum fuel injection pulse signal to drive said fuel injector of said discriminated cylinder.

\* \* \* \* \*